US008569905B2

(12) United States Patent
Boyd-Wilson et al.

(10) Patent No.: US 8,569,905 B2
(45) Date of Patent: Oct. 29, 2013

(54) POWER GENERATOR

(75) Inventors: Peter Boyd-Wilson, North Shore (NZ); Paul Binner, Napier (NZ)

(73) Assignee: Pacer Turbines Limited, Taumaruni (NZ)

(*) Notice: Subject to any disclaimer, the term of this patent is extended or adjusted under 35 U.S.C. 154(b) by 653 days.

(21) Appl. No.: 12/294,309

(22) PCT Filed: Mar. 23, 2007

(86) PCT No.: PCT/NZ2007/000061
§ 371 (c)(1),
(2), (4) Date: Oct. 14, 2009

(87) PCT Pub. No.: WO2007/111517
PCT Pub. Date: Oct. 4, 2007

(65) Prior Publication Data
US 2010/0102570 A1    Apr. 29, 2010

(30) Foreign Application Priority Data
Mar. 24, 2006 (NZ) ..................... 546169

(51) Int. Cl.
F03B 13/00    (2006.01)
H02P 9/04    (2006.01)

(52) U.S. Cl.
USPC ............................................. 290/54

(58) Field of Classification Search
USPC ................................ 290/54, 55, 44
See application file for complete search history.

(56) References Cited

U.S. PATENT DOCUMENTS

| | | | |
|---|---|---|---|
| 1,371,836 A | | 3/1921 | Antz |
| 1,697,574 A | * | 1/1929 | Savonius ............... 416/110 |
| 1,766,765 A | * | 6/1930 | Savonius ............ 416/132 R |
| 1,876,595 A | | 9/1932 | Beldimano |
| 2,218,867 A | | 10/1940 | Beldimano |
| 4,073,516 A | | 2/1978 | Kling |
| 4,165,468 A | | 8/1979 | Fry et al. |
| 4,217,501 A | | 8/1980 | Allison |
| 4,220,870 A | | 9/1980 | Kelly |
| 4,324,985 A | | 4/1982 | Oman |
| 4,715,776 A | * | 12/1987 | Benesh ..................... 415/4.1 |
| 4,838,757 A | * | 6/1989 | Benesh ..................... 415/4.4 |
| 5,448,459 A | * | 9/1995 | Rogers ..................... 362/191 |
| 6,616,402 B2 | * | 9/2003 | Selsam ..................... 415/3.1 |
| 6,802,623 B1 | * | 10/2004 | Hsu et al. ............... 362/199 |
| 7,132,760 B2 | * | 11/2006 | Becker ...................... 290/55 |
| 2005/0025624 A1 | | 2/2005 | Pierson |
| 2008/0237422 A1 | * | 10/2008 | Dalton .................... 248/229.1 |
| 2012/0182723 A1 | * | 7/2012 | Sharrah et al. ............ 362/157 |

FOREIGN PATENT DOCUMENTS

| WO | 9008881 | | 8/1990 |
|---|---|---|---|
| WO | WO 90/08881 | * | 8/1990 |

* cited by examiner

*Primary Examiner* — Javaid Nasri
(74) *Attorney, Agent, or Firm* — Dann, Dorfman, Herell and Skillman, P.C.

(57) ABSTRACT

The present invention relates to a vertical axis turbine 1 apparatus for converting movement of a fluid into electrical power and a method of manufacture of a turbine. The turbine can be installed on a flexible line 2, such as a cable, rope or stay. It could be used on the stay of a yacht. The main rotor 13, 14 of the turbine has least two helical blades arranged about the longitudinal axis with rotational symmetry, the blades being substantially identical in shape and having a lift-producing cross-sectional shape at least along a part of their longitudinal length. A generator 22 coupled to the main rotor 13, 14 and is contained in a generator housing 23.

35 Claims, 11 Drawing Sheets

FIGURE 5A    FIGURE 5B

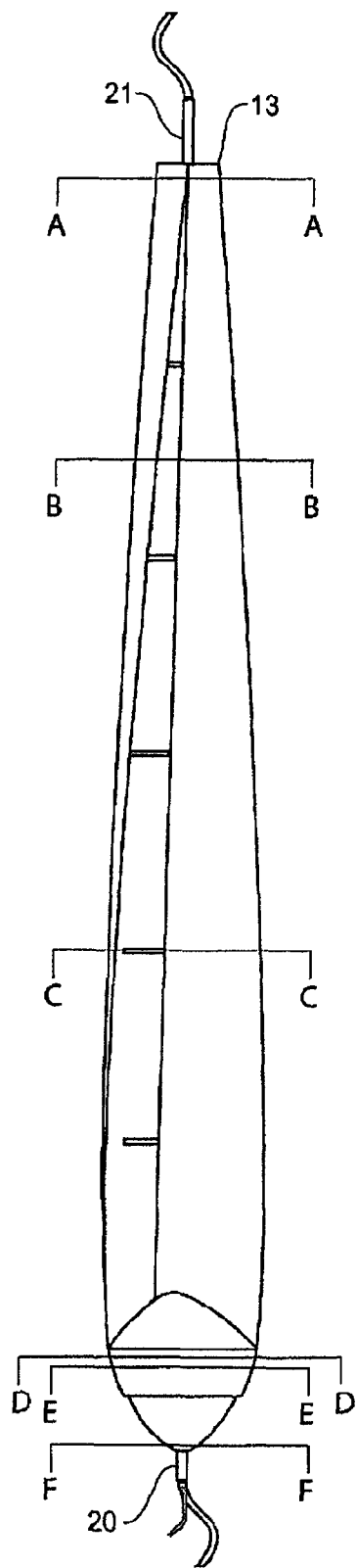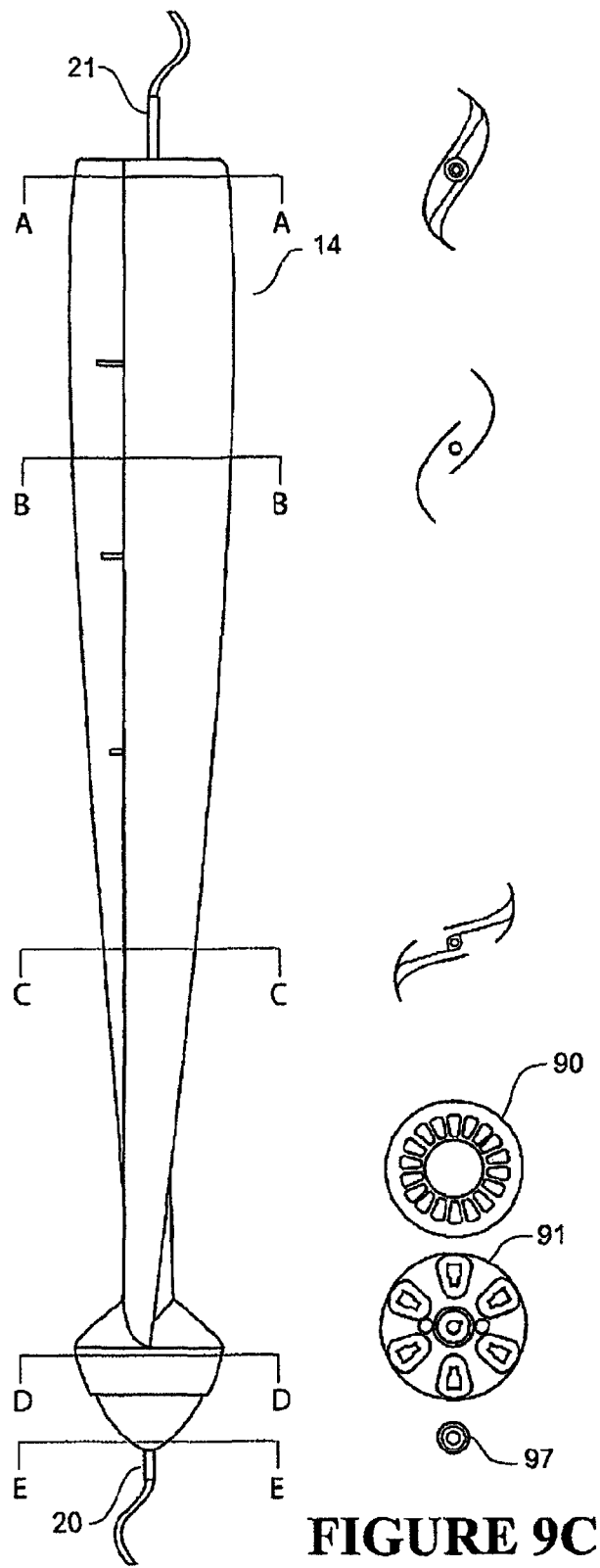
FIGURE 9A  FIGURE 9B  FIGURE 9C

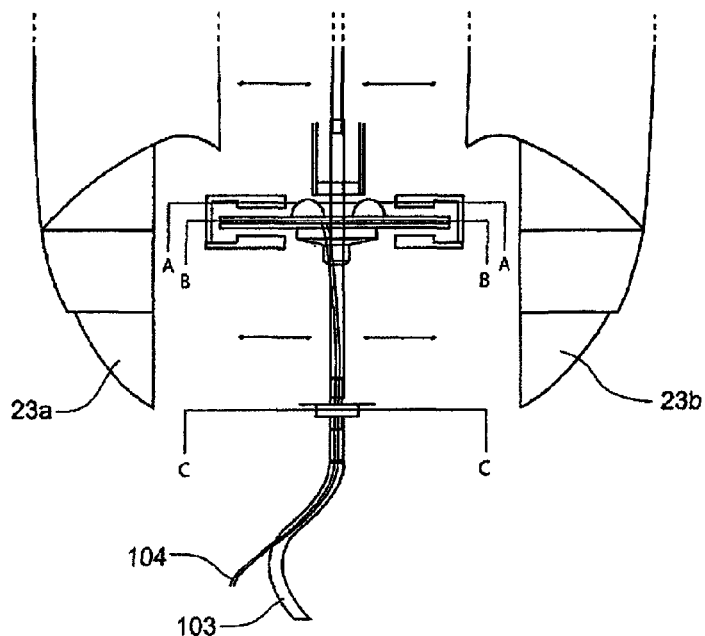
FIGURE 11
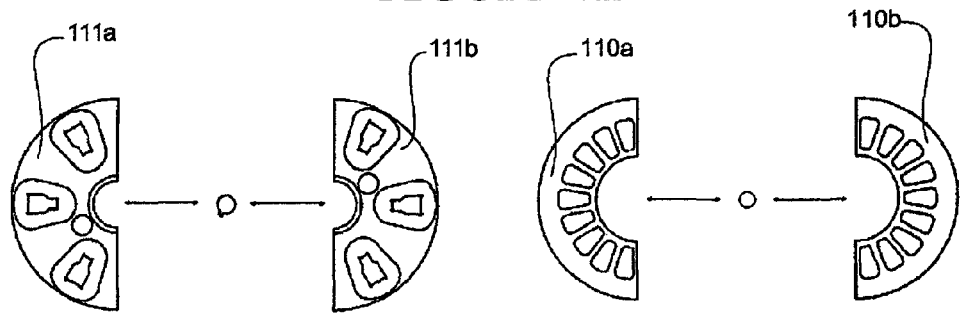
Section B-B
horizontal section through
armature (stator)
FIGURE 12
Section A-A
horizontal section through
magnet ring (rotor)
FIGURE 13
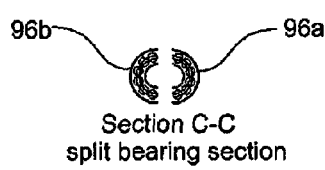
Section C-C
split bearing section
FIGURE 14A
Section B-B
split bearing section
FIGURE 14B

POWER GENERATOR

FIELD OF THE INVENTION

This invention relates to power generators and in particular, though not solely, to electrical power generators using wind turbines and more particularly to portable low power and low cost longitudinal (such as vertical) axis wind turbines used for trickle charging batteries or directly powering electronic devices.

BACKGROUND OF THE INVENTION

Miniaturisation and mass manufacture of portable electronic devices have created a demand for portable power. Sources of power, such as fossil fuels and batteries are respectively increasingly expensive and have limitations in terms of their weight and environmental concerns. Solar cells are another alternative source of portable power although they are commonly fragile, physically large, expensive and require orientation to the sun for maximum efficiency.

Wind energy extraction on a small scale also has limitations. Low power wind generators, under say 3 kW, are commonly of two types:

1. Horizontal axis (propeller) types which are usually mounted rigidly on a pole. Turbines of this type are usually noisy, hazardous to bystanders and take up a large amount of space as the propeller requires orientation into the wind with a vane.

2. Vertical axis wind generators are less common but are once again rigidly mounted, on a tower or bracket and are generally individually fabricated rather than mass-produced. The rotors usually have at least two (usually two or three) identical semi-cylindrical blades or vanes which rotate about a vertical axis. Neighbouring vanes may be connected together or to a central shaft. Alternatively, the inner edges of the vanes may be overlapped to allow the driving fluid to exit a first vane and then pass into a further vane to do further useful work.

This latter type of vertical axis wind turbine is often referred to as a Savonius-type. U.S. Pat. No. 1,697,574A and U.S. Pat. No. 1,766,765A disclose classic Savonious-type rotors. Savonius-type rotors are self-starting however they mostly rely on drag to produce rotation and so are unable to generate blade tip speeds much greater than the driving wind speed. For a given torque output, higher blade tip speeds result in increased output electrical power. They are also relatively inefficient at converting available wind energy into electrical energy. This is because of their reliance on drag wherein while the concave side of a first blade faces the wind creating a driving force, the convex side of another blade is also facing the wind thereby creating a retarding force. Rotation occurs because the convex side of the blade presents less of an obstruction to the wind than the concave side does. Savonius-type rotors are also inherently unbalanced due to the torque produced varying widely with the attack angle of the blade relative to the wind during the rotation cycle. This results in mechanical vibrations in the turbine requiring strengthened support structures, and causes power losses due to parasitic vibrations, increased friction in the bearings, and bearing wear and failure.

An improved Savonius-type rotor is disclosed in U.S. Pat. No. 4,715,776A and U.S. Pat. No. 4,838,757A. This rotor is referred to as a Benesh-type and differs from the Savonius-type in that the blades have an aerofoil (or airfoil) cross-sectional shape. In comparison to the Savonius-type rotor, the Benesh-type rotor is therefore more of a lift-type device and so is theoretically able to rotate at greater tip speeds relative to wind speed. However, the above differences accentuate the unbalanced nature of the Savonius design.

Helical blades are used in some vertical axis wind turbine rotors and can improve the out of balance problem as a part of the helical surface of the blade will always be at an optimal angle of attack to the wind. However, helical blades are more expensive to fabricate than non-helical blades and are not generally capable of cost-efficient moulding techniques such as a single transitional mould release or simple two-part "straight-pull" dies. To minimise eccentric rotation of the shaft due to the aforementioned imbalance, existing vertical axis wind turbines usually have low aspect ratios (rotor height to width) resulting in an undesirable somewhat squat appearance to the turbine. Because of the above limitations, vertical axis wind turbines have not been capable of mass production and existing turbines are not generally portable (that is, easily movable and not requiring permanent mounting) and suitable for low power (say under 3 kW) consumer purposes such as trickle charging batteries.

WO9008881A discloses a vertical axis wind turbine having non-overlapping, non-helical, multi-bladed rotors revolving about (or forming a part of) a stay (a rope or cable supporting the mast) on a yacht. A plurality of separate but coupled rotors is aligned axially along the stay. However, the rotor cross-section profiles disclosed are inefficient with regard to the proportion of available wind energy that they can extract. Improved balance is attempted by increasing the number of blades per rotor which increases the complexity and therefore difficulty of manufacture. Furthermore, because of the lack of blade overlap, the rotors are inefficient and have a stall position that hinders starting in low wind conditions. Also, the wind turbine disclosed requires either replacement of a section of the stay or integration into a stay at the design stage and no retrofitting option that leaves the stay intact is disclosed. The aforementioned disadvantages of non-overlapping blades and the inherent imbalance and low speed capabilities of the Savonius-type rotors also apply to the turbine disclosed in WO9008881A.

SUMMARY OF INVENTION

It is therefore an object of the present invention to provide a turbine apparatus and/or a method of manufacturing a turbine apparatus which will go at least some way towards overcoming the above disadvantages or which will at least provide the public with a useful choice.

In one aspect the present invention may be said to consist in a turbine apparatus for converting movement of a fluid into electrical power comprising:

a main rotor that is rotatable about a longitudinal axis in response to movement of the fluid in a direction substantially perpendicular to the longitudinal axis, the rotor comprising at least two helical blades arranged about the longitudinal axis with rotational symmetry, the blades being substantially identical in shape and having a lift-producing cross-sectional shape at least along a part of their longitudinal length, each blade having an outer edge lying on a circle defining the diameter of the rotor and in inner edge located between the longitudinal axis and the side of the diameter circle generally opposite to the inner edge such that the inner edges of the blades overlap, a generator coupled to the main rotor and having a stationary armature containing windings and a generator rotor connected to rotate with the main rotor and which carries one or more magnets past the windings, and a mounting provided at least one longitudinal end of the main rotor, non-rotationally connected to the armature, wherein the mounting is adapted to be connected to a flexible line such that the turbine apparatus can be supported by the mounting so as to be substantially immovable along its longitudinal axis but is able to move at least a limited amount in a direction laterally of the longitudinal axis when connected to a flexible line.

Preferably, a mounting is provided at both longitudinal ends of the main rotor and both mountings are adapted to be fixed to a flexible line.

Preferably, the apparatus is adapted to be connected to flexible line that is sufficiently stiff to resist twisting as the main rotor rotates.

Preferably, the apparatus is formed in two or more segments that can be connected together about the longitudinal axis to connect the turbine apparatus to a flexible line.

Preferably, the blades are shaped to comprise at least one bridging section between their longitudinally opposed ends, the bridging section being formed on the side of the blade nearest to the longitudinal axis and shaped such that the bridging sections of all blades contact so as to fix the spacing between blades along their length.

Preferably, the bridging sections of the blades are provided with interlocking means adapted to connect to interlocking means on adjacent blades.

Preferably, the bridging sections comprise a cut-out portion in their central region so that when the blades are connected together, a central passage is provided along the longitudinal axis of the rotor.

Preferably, the bridging sections extend substantially perpendicularly to the longitudinal axis.

Preferably, a shaft is provided along the longitudinal axis of the main rotor and the generator armature is fixed non-rotatably to the shaft.

Preferably, the mountings are provided at either end of the shaft.

Alternatively, a central passage of the main rotor is adapted to receive a flexible line which the blades are assembled together about.

Preferably, a central passage of the main rotor is adapted to receive a flexible line which the assembled blades are threaded over.

Preferably, the generator rotor is cup-shaped and the magnets held thereby rotate about the armature.

Preferably, the generator is positioned at one end of the main rotor.

Preferably, the generator is positioned at a point along the length of the main rotor.

Preferably, the main rotor comprises a light source directed to illuminate at least part of the rotor blades or generator housing Preferably, the light source is powered by the generator.

Preferably, the blades are formed from a translucent material.

Preferably, the light source is arranged so as to direct light towards an edge of a blade.

Preferably, the light source is arranged so as to cause the rotor or generator housing to glow.

In another aspect the present invention may be said to consist in an electricity generation system for generating electricity from movement of a fluid, comprising:

a turbine apparatus comprising a main rotor that is rotatable by movement of a fluid, a generator having a generator rotor that is rotated by the main rotor and which carries at least one magnet past windings of a stationary armature, a light source provided on the turbine apparatus to illuminate the main rotor or generator housing, and a controller adapted to switch the light source on or off.

Preferably, a rechargeable battery is connected to receive power output by the generator and the controller turns the light source on when it is determined that the battery is charged to a predetermined level.

Preferably, the controller is connected to receive user input and in response to a predetermined input from a user, the light source is turned on.

Preferably, the turbine apparatus comprises a vertical axis wind turbine that is adapted to be connected to, on or about a flexible line on a sailing vessel.

Preferably, the light source is provided within a housing at one end of the main rotor.

Preferably, the main rotor is formed from a translucent material and the light source is arranged so as to direct light towards an edge of the main rotor, or to cause the rotor or generator housing to glow.

Preferably, the brightness and/or colour of the light source is adjustable by the controller in order to provide a visual indication of a predetermined condition.

In another aspect the present invention may be said to consist in a turbine apparatus for converting movement of a fluid into electrical power comprising:

a main rotor that is rotatable about a longitudinal axis in response to movement of the fluid in a direction substantially perpendicular to the longitudinal axis, a generator coupled to the main rotor and having a stationary armature containing windings and a generator rotor connected to rotate with the main rotor and which carries one or more magnets past the windings, and a mounting provided at least one longitudinal end of the main rotor, non-rotationally connected to the armature, wherein the generator is coaxial with the longitudinal axis of the main rotor and the main rotor or generator is formed in at least two separate parts which are interconnectable about the longitudinal axis.

Preferably, the mounting is adapted to be connected to a flexible line such that the turbine apparatus can be supported by the mounting so as to be substantially immovable along its longitudinal axis but is able to move at least a limited amount in a direction laterally of the longitudinal axis when connected to a flexible line.

Preferably, the main rotor and the generator rotor are each provided with split bearings mountable about the flexible line to thereby allow the main rotor and generator rotor to rotate freely with respect to a flexible line to which the turbine apparatus it is connected.

Preferably, a mounting is provided at both longitudinal ends of the main rotor and both mountings are adapted to be fixed to a flexible line.

Preferably, the apparatus is adapted to be connected to flexible line that is sufficiently stiff to resist twisting as the main rotor rotates.

Preferably, the two separate parts can be connected together about the longitudinal axis to connect the turbine apparatus to a flexible line.

Preferably, the blades are shaped to comprise at least one bridging section between their longitudinally opposed ends, the bridging section being formed on the side of the blade nearest to the longitudinal axis and shaped such that the bridging sections of all blades contact so as to fix the spacing between blades along their length.

Preferably, the bridging sections of the blades are provided with interlocking means adapted to connect to interlocking means on adjacent blades.

Preferably, the bridging sections comprise a cut-out portion in their central region so that when the blades are connected together, a central passage is provided along the longitudinal axis of the main rotor.

Preferably, the central passage of the rotor is adapted to receive a flexible line which the blades are assembled together about or threaded over.

In another aspect the present invention may be said to consist in a method of manufacturing a turbine apparatus comprising the steps of:

i) moulding at least two separate but identical rotor blades to comprise a helical twist from one longitudinal end to the other, the blades having a substantially constant cross-sectional curvature along their length, the curve having a starting point at a first side edge of the blade and an end point at a second side edge of the blade, and ii) creating a main rotor by arranging the moulded rotor blades spaced about a longitudinal axis and in an overlapping manner, and iii) mounting a generator to the main rotor so that the rotor of the generator is driven by the main rotor.

Preferably, the step of moulding the blades includes setting the angle of the helical twist dependent upon the concavity of the blade's cross-sectional curvature wherein the concavity of the curve is measured by the angle between tangents to the curve at the starting and end points.

In another aspect the present invention may be said to consist in a method of manufacturing a turbine apparatus comprising the steps of i) extruding at least two separate but identical rotor blades to comprise a helical twist from one longitudinal end to the other, the blades having a substantially constant cross-sectional curvature along their length, the curve having a starting point at a first side edge of the blade and an end point at a second side edge of the blade, and ii) creating a main rotor by arranging the moulded rotor blades spaced about a longitudinal axis and in an overlapping manner, and iii) mounting a generator to the main rotor so that the rotor of the generator is driven by the main rotor.

Preferably, the main rotor has a helical structure to reduce load on its bearing(s).

Also described but not claimed, the light source is provided on a plate within a housing at an end of the rotor.

Also described but not claimed, the plate is attached to or forms a part of the armature.

Also described but not claimed, the blades are helically twisted by about 90°.

Also described but not claimed, the blades are manufactured by injection moulding techniques.

Also described but not claimed, a controller controls the illumination of the light source wherein the brightness and/or colour of the light source is adjustable by the controller in order to provide a visual indication of a predetermined condition.

Also described but not claimed, the generator is also provided within the housing.

Also described but not claimed, the light source is powered by the generator.

Also described but not claimed, the bridging sections extend substantially perpendicularly to the longitudinal axis.

Also described but not claimed, the mounting means are provided at opposed ends of the shaft.

Also described but not claimed, the central passage of the rotor is adapted to receive a cable or rope which the blades are assembled together about.

Also described but not claimed, the amount of helical twist is less than or equal to 180° less the blade's concavity angle.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting

BRIEF DESCRIPTION OF THE DRAWINGS

Preferred embodiments of the invention will now be described with reference to the accompanying drawings in which:

FIG. 5A is a front elevation of a complete wind turbine in accordance with a first embodiment of the present invention, FIG. 5B is a side elevation of the complete wind turbine of FIG. 5A, FIG. 9A is a front elevation of a first part of a two-part version of the wind turbine according to a second embodiment of the present invention, FIG. 9B is a side elevation of a second part of a two-part wind turbine, complimentary to the first part shown in FIG. 9A, FIG. 9C is a series of cross-sectional views taken at regular intervals along the length of the first and second parts as shown in FIGS. 9A and 9B respectively showing the bridging sections and the armature and rotor of a generator in the housing, FIG. 11 is a side elevation of an exploded generator housing section of the turbine of FIG. 10A, FIG. 12 is a cross-sectional plan view through the line BB in FIG. 11 showing the generator armature in two parts, FIG. 13 is a cross-sectional plan view through the line AA in FIG. 11 showing the generator rotor in two parts, and FIGS. 14A and 14B are cross-sectional plan views through the lines BB and CC respectively of FIG. 11 showing the bearings in two parts.

DETAILED DESCRIPTION OF THE PREFERRED EMBODIMENTS

Figure 1:
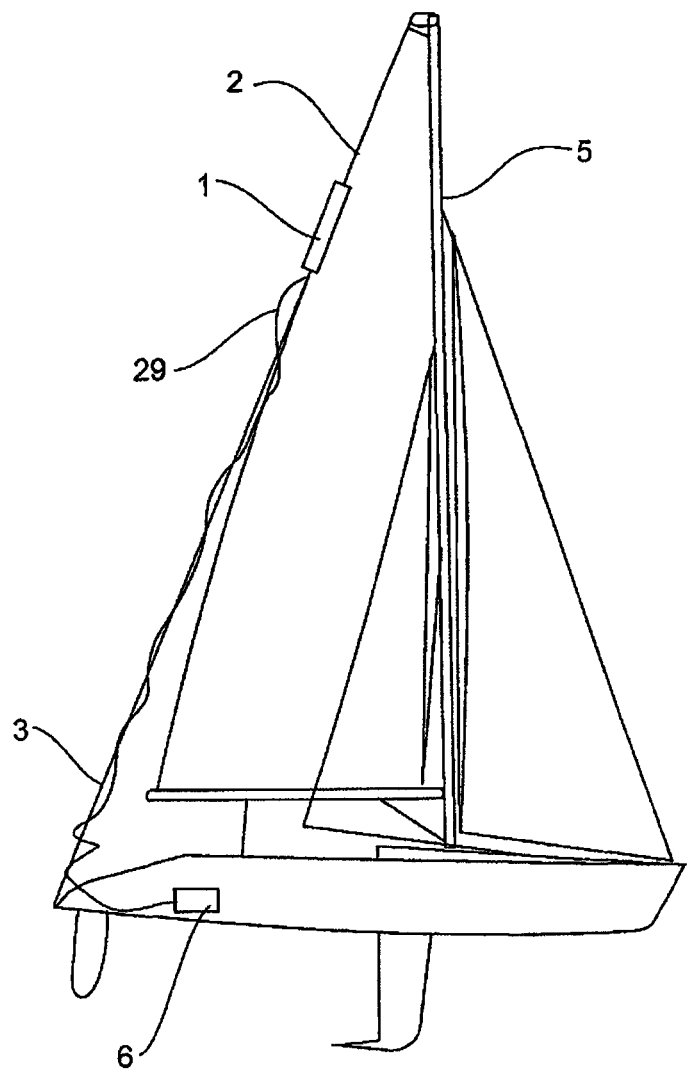
FIG. 1 is aside elevation of a sail boat in which a wind turbine according to a first embodiment of the present invention is installed.

With reference in particular to FIG. 1, a turbine apparatus 1 according to a first embodiment of the present invention is shown. The turbine apparatus is portable (in that it is small, lightweight and easily moved from one place to another) and has an elongated shape including a part which rotates about a longitudinal axis in response to movement of a fluid such as water or more preferably wind. The turbine apparatus is therefore of the type generally referred to as a longitudinal or vertical axis wind turbine. As will be explained below, it is thought to be particularly advantageous to mount turbine 1 flexibly or non-rigidly such as by attaching the longitudinal ends to cables or ropes 2,3 which are slightly tensioned. As will be explained below, the turbine could be attached around a single cable or rope.

A use of the turbine 1 is in the generation of electricity to power consumer electronic devices having relatively low power requirements. As seen in FIG. 1, it is anticipated that the turbine according to the present invention will be particularly suited to generating electricity on boats and in particular, on sail boats which comprise flexible lines, e.g. cables or ropes, acting as stays to support a mast 5. It will be appreciated that the turbine could be installed in other situations also and this example should not be considered limiting. For example, the turbine could be put on a tent stay, or installed anywhere else where a flexible line exists and power generation is required. For this purpose, the turbine includes a generator driven by the rotating part of the turbine and which outputs electrical energy. Because of the fluctuating power output inherent in electricity generation devices relying on the random movement of a medium such as wind or water, the electrical energy output from the generator is preferably regulated before being provided to electronic devices or to an energy storage device such as a lead-acid battery 6. The output DC voltage from battery 6 may be converted to a suitable DC voltage or inverted to an appropriate AC voltage for use by consumer electronic devices.

Figure 2:
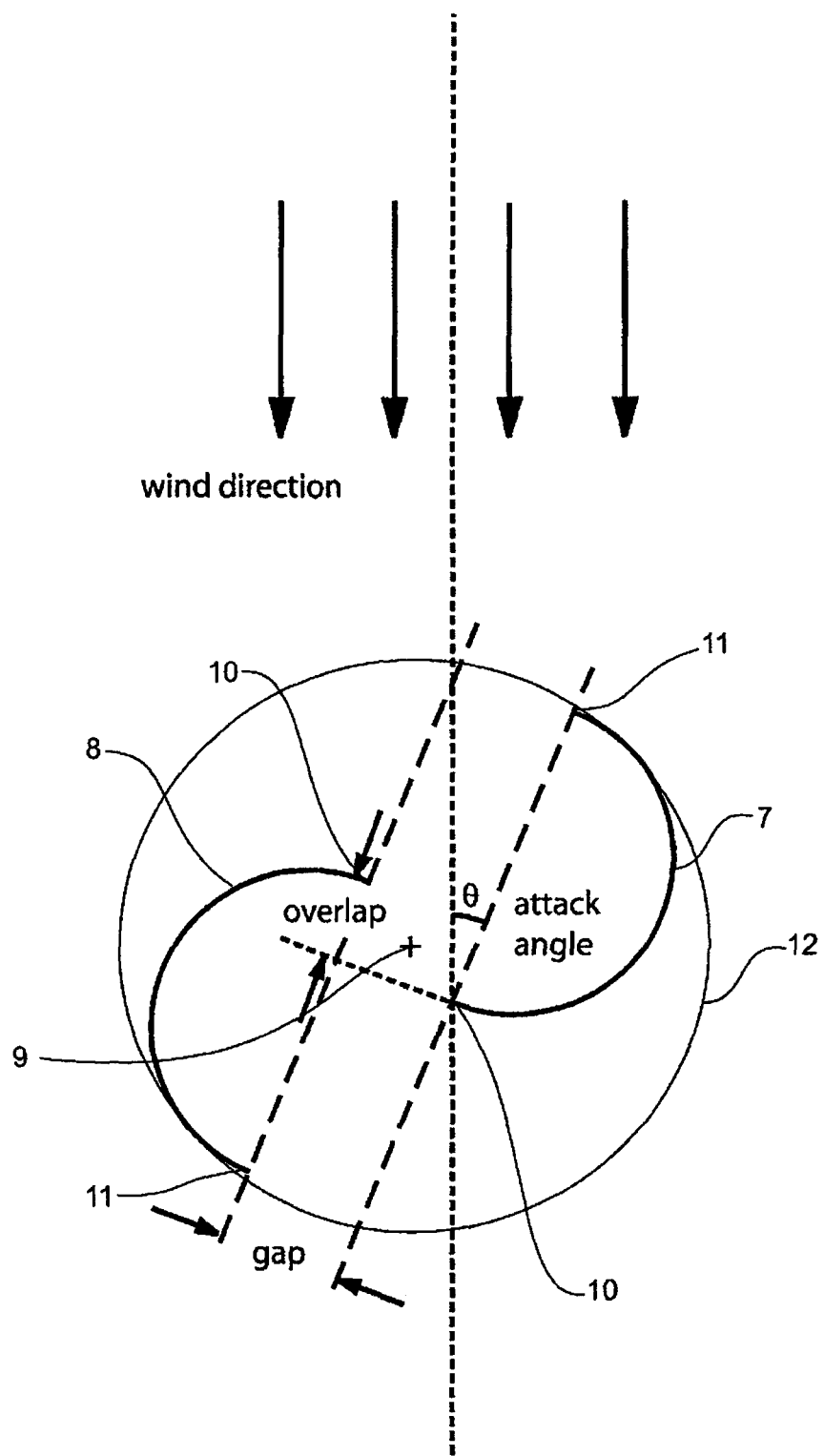
FIG. 2 is a diagram in plan view demonstrating some of the terms used to describe the present invention.

FIG. 2 demonstrates some important terms used later to describe the operation of the turbine according to the invention. The rotor of the turbine according to the invention is generally of the Savonius-type having at least two longitudinal blades 7,8 fixed in relation to a longitudinal axis 9. The blades have an aerofoil type shape. The blades are substantially identical in shape and have a concave side and a convex side. As can be seen in FIG. 2, blade 7 has an angle of attack (θ) to the wind direction and its concave side is in a position to receive wind. The wind received in the concave side of blade 7 will produce a driving torque attempting to rotate the rotor clockwise about axis 9. It will be appreciated that as the angle of attack changes, so does the torque produced by the rotor (maximum torque being produced at θ=30° to 45°). However, the blades are twisted, for example helically twisted, so that at most points in time, some point along the longitudinal length of the blade will be at an optimum or near optimum angle of attack to the wind. In this way, the rotor should "self-start" without requiring external input. The direction of twist (or chirality) may be left- or right-handed (that is, clockwise or anti-clockwise). However, because in a twisted rotor the rotor face is always at an angle to the wind, an axial force is generated in the rotor. A clockwise twist (as shown in the drawing figures) has the advantage that the axial force is directed upwards, opposing the gravitational force due to the weight of the rotor. Accordingly, the load experienced by the mounting structure and bearings is reduced thereby extending their expected life time and maximising the power output from the rotor. Preferably the cable or rope that is sufficiently stiff to resist twisting as the main rotor rotates.

At the same time as blade 7 produces a clockwise driving force, the wind will also flow against the convex surface of blade 8 producing an anti-clockwise torque. Because the magnitude of the clockwise torque is greater than the magnitude of the anti-clockwise torque, and because of aerofoil lift generated, the rotor will rotate in a clockwise direction.

It will also be seen in FIG. 2 that each blade has an inner edge 10 and an outer edge 11. As the rotor rotates about axis 9, the outer edge prescribes a circle 12 defining the diameter of the rotor. It can be seen that the inner edges 10 "overlap" one another. That is, the inner edge of each blade is between the axis and the side of the diameter circle generally opposite to the side having the outer edge of that blade. In this way, wind which is incident within the concave side of a blade and which exits the blade from the inner edge, is then directed to the concave surface of the other blade (or the next blade in the case of more than two).

FIG. 2 also demonstrates the concept of a "gapped" rotor wherein the two blades are separated laterally about the axis. That is, there is a gap between the two parallel lines formed by joining each blade's inner and outer edge when viewed from above. We have found that there is no benefit in including a gap in the rotor. Our tests show that rotor efficiency is maximised with a gap of zero and that efficiency reduces with positive and negative gaps. Preferably, therefore, the present rotor includes some overlap and minimal or no gap wherein gap and overlap are as described above.

Figures 3A, 3B, 3C:
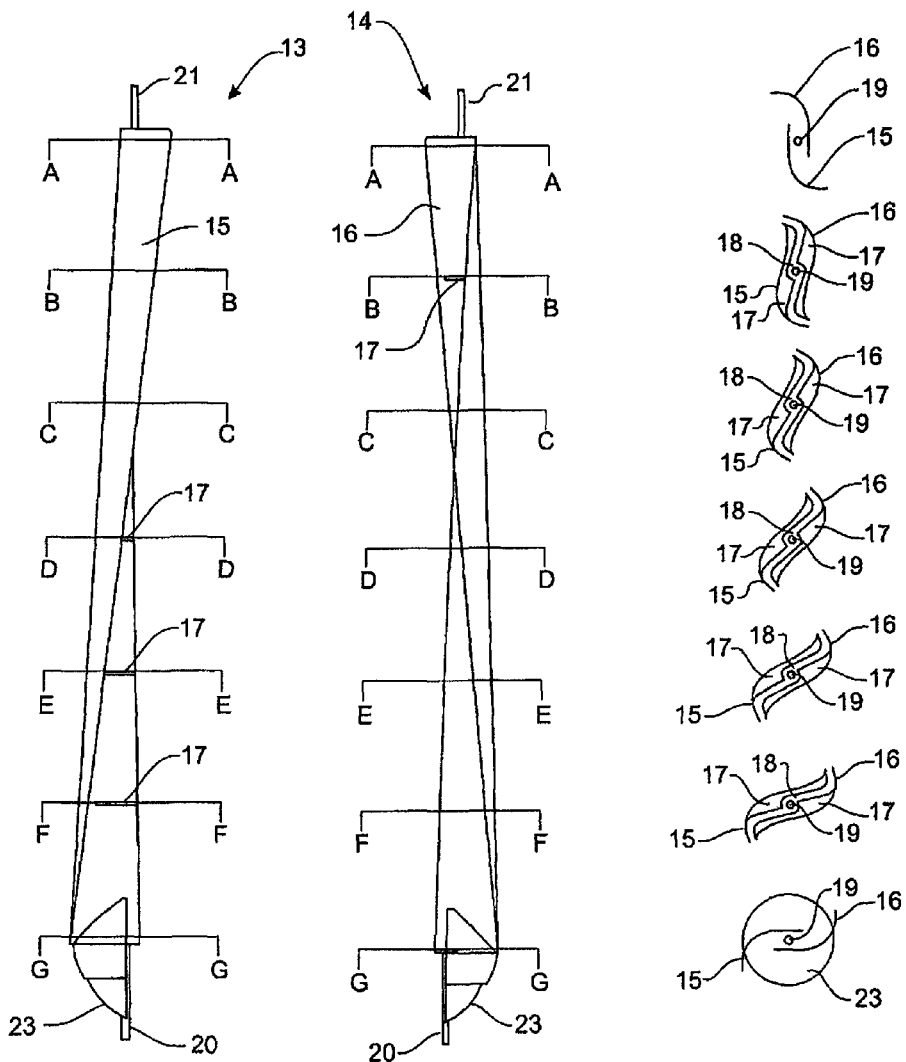
FIG. 3A is a front elevation of a first part of a two-part version of the wind turbine according to a first embodiment of the present invention.
FIG. 3B is a front elevation of a second part of a two-part wind turbine, complimentary to the first part shown in FIG. 3A.
FIG. 3C is a series of cross-sectional views taken at regular intervals along the length of the first and second parts shown in FIGS. 3A and 3B slightly separated.

FIGS. 3A and 3B are front elevations of a first embodiment of the turbine according to the invention. In this first embodiment, the turbine is formed in two substantially identical parts 13 and 14 these parts forming the main rotor 13, 14. It will be appreciated however that the turbine could be formed in more than two parts. From a practical perspective, it is desirable that the parts be identical and in the case of a two-part turbine, that they have 180° rotational symmetry. In one aspect of the invention, the parts are identical in order to simplify manufacture. The two parts may then be formed in a single plastics injection moulding machine thereby minimising tooling and production costs. The can then be arranged together in an overlapping manner. Preferably the main rotor parts 13, 14 are formed from a plastics material such as polycarbonate which is light, strong, translucent and easily coloured or tinted. Although moulding is preferred for its cost benefits, the turbine could be manufactured by extrusion.

Main rotor part 13 includes a blade 15 that has an about 90° anti-clockwise helical twist from its base to its upper longitudinal end. Main rotor part 14, being identical to part 13 includes a blade 16 with an about 90° anti-clockwise helical twist from its base to its upper longitudinal end. The internal surfaces of each of the blades 15,16 are provided with strengthening bridging sections 17 spaced, preferably regularly, between their longitudinal ends.

The shape of bridging sections 17 are more clearly shown in FIG. 3C. The bridging sections extend substantially perpendicularly to the longitudinal axis of the main rotor and are designed to fit with a corresponding bridging section from the other rotor part. Each bridging section includes a first projecting portion nearest the outer edge of the blade and a second projecting portion nearest the inner edge of the blade. The first projecting portion extends outwardly from the inner surface of the blade further than the second projecting portion does. Also, the width (laterally of the longitudinal axis) of the first projecting portion is smaller than the width of the second projecting portion so that when the bridging sections from the first and second rotor parts are brought together, a central passage 18 is formed in which the longitudinal axis resides. Note that in FIG. 3C the two rotor parts are shown close to one another but they are not in their final assembled positions and so there is a gap between the bridging sections. The central passage through the rotor parts allows a shaft to be installed to help resist tension introduced in the rotor by the mounting method and to resist bending of the turbine. The shaft may be formed from about 8 mm diameter, preferably hollow stainless steel for example although it is not essential that a central shaft be incorporated into the turbine.

Figure 5C:
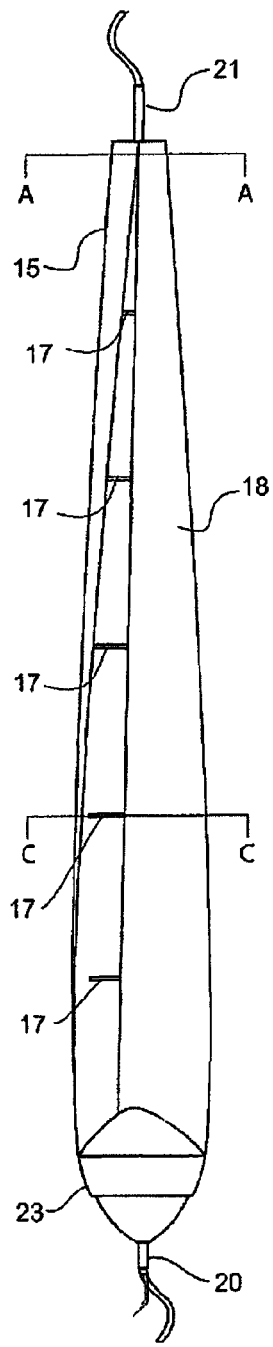
FIG. 5C is a cross-sectional view through line AA of FIGS. 5A and 5B.
Figure 5C:
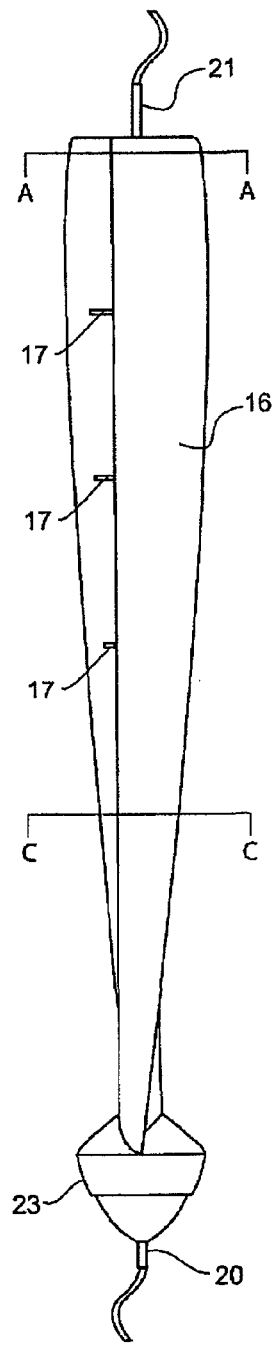
Figure 5C:
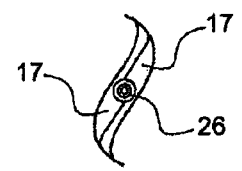
Figure 5D:
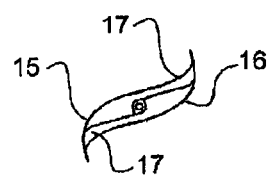
FIG. 5D is a cross-sectional view through line CC of FIGS. 5A and 5B.

The upper and lower ends of the blade are provided with means to allow the turbine to be flexibly mounted so that the rotor may rotate and thereby generate electricity. The mounting means may be provided by extending the central shaft from the two longitudinal ends and forming attachments to enable ropes or cables to be fixed thereon. Alternatively, for a shaftless version of the turbine, the upper and lower ends of the turbine may be provided with stationary pins 20,21 which project from the rotor and which may be connected to ropes or cables. The inner ends of the pins would be fixed within the rotor within bearings (such as roller or ball thrust bearings) so that the rotor is able to rotate about the pins. A bearing 26 in which the upper pin 21 is mounted could conveniently be housed within a specially shaped seat in the uppermost bridging section 17 (see FIG. 5C). The shaft or pins may be hollow to provide a convenient passage for wiring 29 to enter/exit the turbine without interfering with the rotating parts.

The lower pin 20 could be mounted similarly to the upper pin 21. However, it is preferred that the generator 22 (see FIG. 6) is housed provided within a housing 23 formed at the base of the turbine. Generator housing 23 is formed from two housing parts formed in the rotor parts 15 and 16 and is preferably sealed against water ingress by an O-ring or the like between the two parts. It is not essential that the generator be positioned at the base of the rotor as it is considered that the generator could be positioned at any position along the length of the rotor. In the embodiment shown in the drawings, the generator is housed near the base of the rotor as shown most clearly in FIG. 6. The generator in the first embodiment is co-axial with the longitudinal axis of the turbine and is of the "cup" or "flat" variety often referred to as "inside-out" as the rotor 24 (carrying a number of permanent magnets arranged cylindrically) is external of the stator or armature 25 (comprising windings wound about poles formed in a magnetically permeable core), although the opposite configuration is also possible, and has advantages with regards to rotational inertia. Pin 20 is therefore required to pass through both the generator rotor 24 and stator 25 whilst allowing the rotor to rotate freely of the pin. Accordingly, a pair of bearings 27,28 is provided. The outer race of bearing 27 is mounted within a seat formed by the interconnection of the two rotor parts 13 and 14 while the inner race is attached (and perhaps keyed) to pin 21. The inner end of pin 20 passes through and is connected non-rotatably (by keying for example) to armature 25 and then passes through generator rotor 24. Bearing 28 is mounted within rotor 24 to ensure that generator rotor 24 is able to rotate relative to pin 20.

Figure 7:
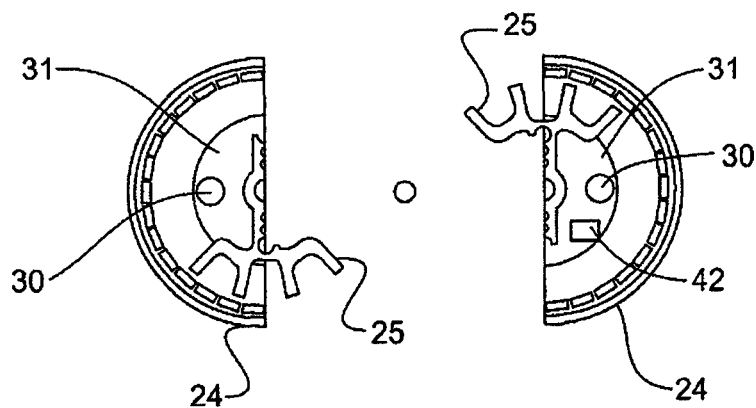
FIG. 7 is a cross-sectional plan view through line AA in FIG. 6 showing the generator in two parts.

In one embodiment, the central shaft may be omitted and the two (or more) rotor parts may be assembled about a rope or cable such as a stay on a sail boat. The rope or cable would pass through the central passage formed by the bridging sections 17 and the rotor would rotate around the rope or cable. To enable a truly "in-service" fitting of the turbine to an existing cable or rope, each of the bearings and the generator rotor and armature are all formed in two parts. The bearings are therefore provided as split bearings which are assembled about the existing stay. As shown in FIG. 7, the rotor and generator are also formed in two parts which may be connected and held together. The rotor halves and generator halves may be held together by complementary fastening fittings formed thereon or by crimping, bonding, soldering or welding for example. In a variation of this embodiment, sufficiently large cylindrical spacing sleeves could be fitted over the pre-existing rope or cable such as a stay to allow the central passage within the rotor and bearings to be large enough to allow the rotor to be threaded over the cable stay. The latter commonly has an expanded end or ends for purposes of attachment. In this embodiment, the pins 20 and 21 could be replaced by sleeves which are fixed (such as by crimping) to the cable or rope at predetermined positions. The bearings and generator could then be assembled about the sleeves as has been described above in relation to the pin version. Using this method, the bearings would not need to be split and the rotor could be preassembled.

Figure 6:
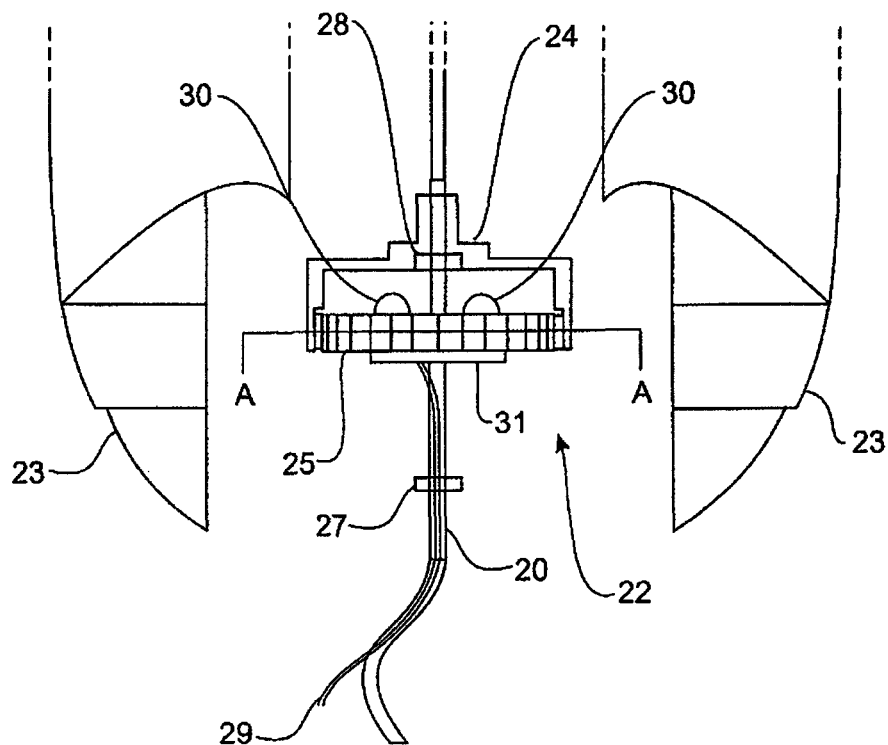
FIG. 6 is a side elevation of the generator housing section of the turbine of FIG. 5A with the rotor halves slightly separated.

It can also be seen in FIGS. 6 and 7 that a light source is provided within the turbine. The light source is preferably formed by at least one light emitting diode (LED) 30. Conveniently, LEDs 30 are provided within generator housing 23 and arranged so that they direct light upwards towards the blades. As the generator housing is formed from a translucent material, light will pass through the upper conical surface of the generator housing and illuminate the blades. Furthermore, the lower edges of blades 15 and 16 (where the blades meet the conical upper surface of the generator housing) are also illuminated by the LEDs. Because the blades are formed from translucent material, light is conducted some way into the blades, and to the blade edges and will make the rotor glow with sharply lit edges. The LEDs may, for example, be rated at between about 1 and 2 Watts. The light source can illuminate the rotor for the purpose of self or general advertising, or for general illumination. The light source can also be arranged to illuminate the surroundings.

The LEDs are preferably mounted on a circuit board 31 within the generator housing. Most conveniently, circuit board 31 also forms a mounting plate for armature 25 or alternatively forms the armature itself. So that the LEDs may illuminate the blades, the rotor 24 may be formed from a transparent or translucent material such as polycarbonate.

Circuit board 31 may also hold an electronic circuit for receiving the variable AC voltage output from the armature of the generator and for regulating and converting this voltage to a relatively smooth and constant DC level of around 12V. This smoothed and regulated DC output voltage could be provided to wires 29 for connection to rechargeable battery 6. A suitable socket such as an automotive "cigarette lighter" socket could also be connected to the regulated output of the generator to allow a user to easily connect portable appliances with a suitable plug. The output of the regulating circuit could also be used to power the LEDs.

Figure 8:
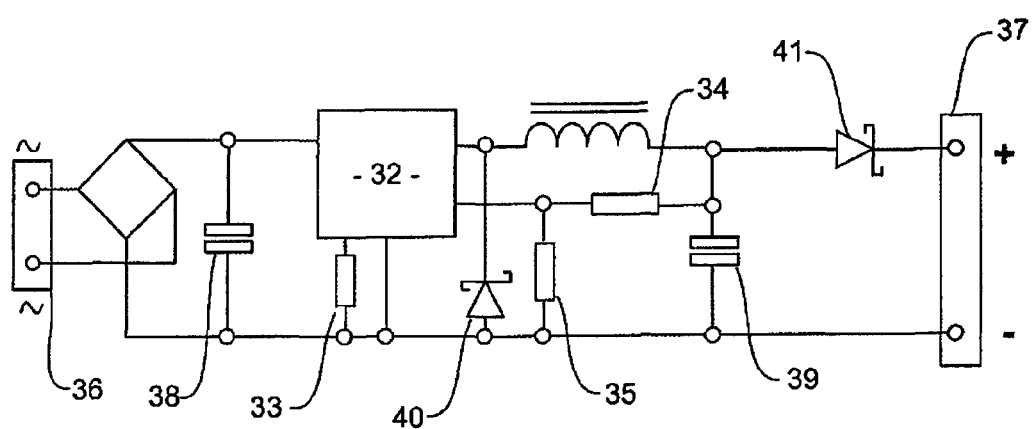
FIG. 8 is a schematic diagram of a voltage regulating circuit which converts the AC output from the generator of the wind turbine to a regulated DC voltage.
Figure 10A:
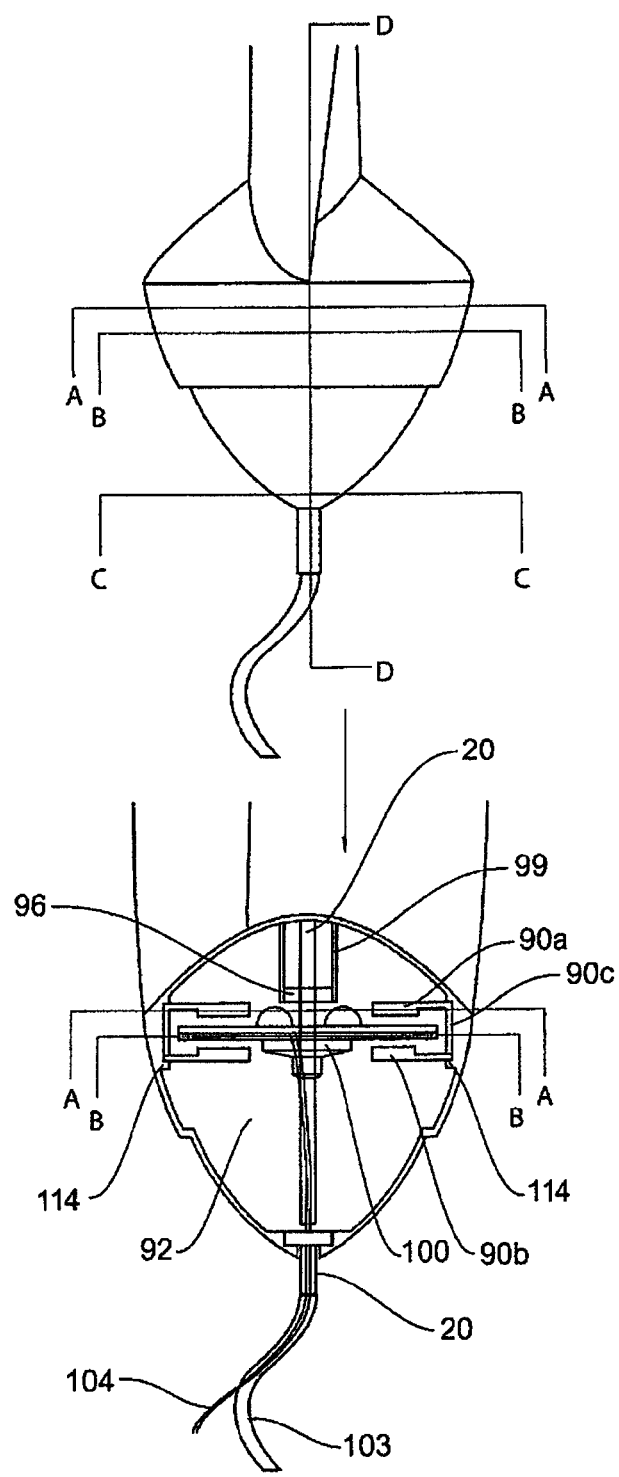
FIG. 10A is cut-away portion of the housing illustrating the generator in the housing.
Figure 10B:
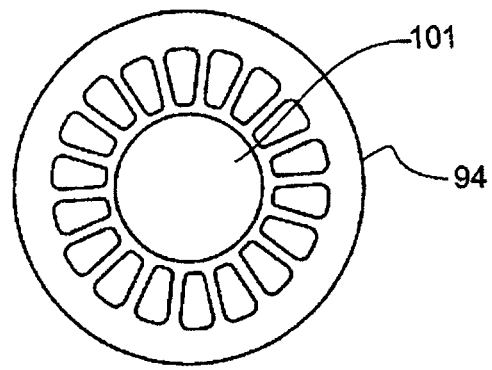
FIG. 10B is a cross-sectional view through the line AA of FIG. 10A.
Figure 10C:
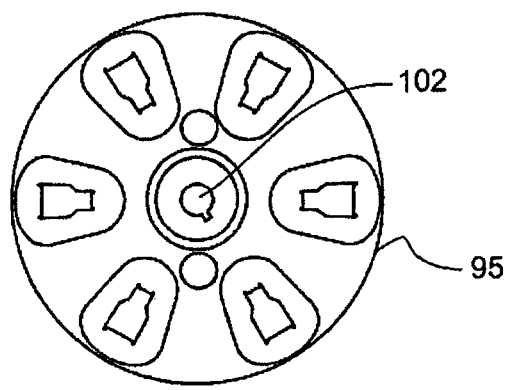
FIG. 10C is a cross-sectional view through line BB of FIG. 10A.
Figure 10D:
FIG. 10D is a cross-sectional view through line CC of FIG. 10A.

A suitable switching regulator circuit is shown in FIG. 8 which receives the output of the generator at terminals 36 and provides a regulated DC output voltage at terminals 37. Circuit element 32 is a switching regulator such as National Semiconductor's LM5010 regulator. Resistor 33 provides a current limit input setting to the regulator and the voltage divider formed by resistors 34 and 35 provides a voltage feedback input to the regulator. Capacitors 38 and 39 are for voltage smoothing purposes and diode 40 provides a flyback clamp. Diode 41 provides protection to the circuit in case the output terminals are connected to the incorrect terminals of rechargeable battery 6.

The overall effect of illumination of the turbine from within is visually appealing and may serve a number of purposes. Firstly, the blades may carry advertising or other graphical information and illumination in this fashion is likely to cause people to look at the turbine and the information carried thereon. Another use of the illumination system is as an anchor light for the sailing vessel. For this purpose, a light sensor could be fitted, a remotely positioned switch could be provided in a convenient location for users of the vessel. When turned on, automatically or otherwise the switch would cause the LEDs to be energised so that the turbine is illuminated. To qualify as an anchor light, the light must be visible over 360° and for vessels under 50 m in length, the light must be white and have an intensity of at least 4.3 candelas.

Alternatively, the light may be used for general illumination. Another possible use of the illumination system is to provide a visible indication to a user that battery 6 is fully charged. For this purpose, circuit board 31 could be provided with a controller 42 such as a microprocessor or a logic circuit capable of monitoring the change in battery current and/or voltage over time. The controller or logic circuit could also manage trickle charging of the battery so that a suitable charging profile is attained. When the controller or logic circuit senses that the battery is fully charged, a switch may be turned on thus energising the LEDs. Alternatively, the brightness of the LEDs may be adjusted dependent upon the degree of battery charge so that, for example, maximum brightness indicates that the battery is fully charged. The LEDs could also be of different colours and particular colours of LEDs could be energised to indicate to a user that the battery is, or batteries are, fully charged, or charging to a particular predetermined level has occurred or that a fault has occurred. This would be particularly useful as a user of the sailing vessel could tell the charging status of the battery at a distance if, for example, the vessel was moored. The controller or logic circuit could alternatively be housed away from the turbine.

Figure 4A:
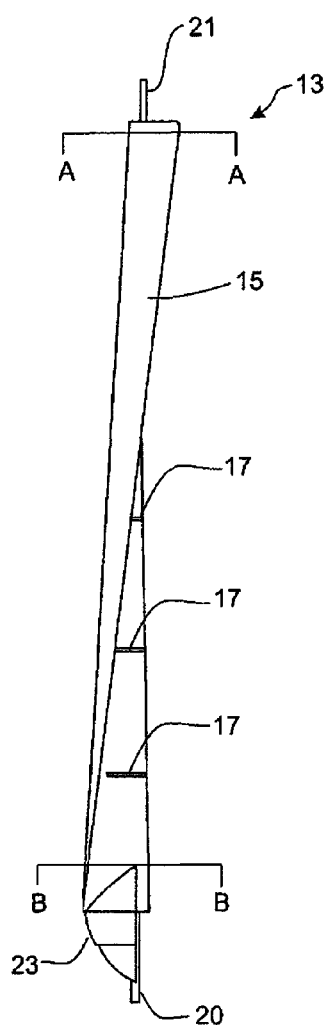
FIG. 4A is a front elevation of the first turbine part, similar to that shown in FIG. 3A.
Figure 4B:
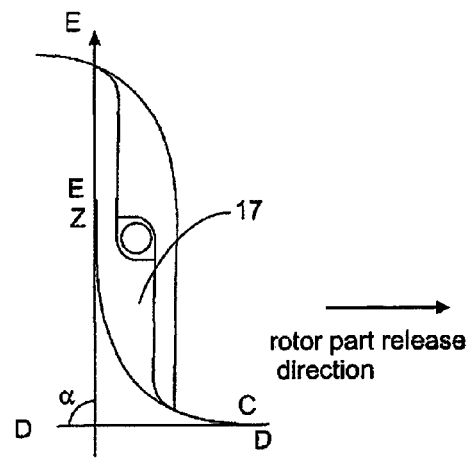
FIG. 4B is a cross-sectional view through the line AA in FIG. 4A.
Figure 4C:
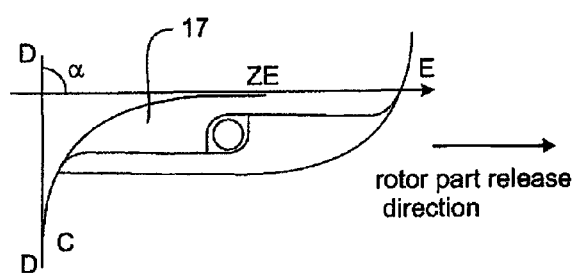
FIG. 4C is a cross-sectional view through the line BB in FIG. 4A.

As mentioned previously, the rotor parts are preferably injection moulded from a plastics material. Because the rotor parts include a helical twist, the complexity of the tooling is potentially increased. We have discovered that the degree of possible twist of each rotor part (or blade) for a single translational mould release is related to the degree of concavity of the blade's surface. FIGS. 4A to 4C demonstrate this discovery.

FIGS. 4B and 4C are cross-sections through an upper part and a lower part of rotor part 13 respectively. In cross-section, blade 15 extends from its inner edge at point Z to the outer edge at point C. Line EE is a tangent to the curve of the blade at inner edge Z while line DD is a tangent to the blade curve at outer edge D. Therefore, angle $\alpha$ describes the angular rotation (or depth) from one edge of the blade to the other. The deeper or more concave the blade, the larger $\alpha$ becomes.

To minimise manufacturing costs, a single translational mould release (or "straight-pull") is desirable and this requires that the moulded shape does not include an undercut. The maximum degree of helical twist possible using a single transitional mould release may approximately be found by subtracting $\alpha$ from 180°. For example, the blades shown in FIGS. 4B and 4C have a depth a of approximately 90° and so the blades are able to have a helical twist of around 90° (180°−90°) also. If the depth of curvature of the blades was greater, say 110°, then the amount of helical twist allowable in the blade while still allowing the rotor part to be simply moulded would be only about 70°. This relationship is not exact as an allowance must be made for draft angles to allow release of the part from the mould.

In a preferred form, the turbine may be about 130 mm in diameter by about 900 mm long. That is, an "aspect ratio" (length÷width) of around 7.5. We have tested the turbine and found that the generator produces around 14 Watts of power at around 1350 rpm in a 10 ms$^{-1}$ wind with efficiency of wind energy extraction ($C_p$) of over 22%. The turbine described above may be sold with the two-parts of the rotor connected together and with the generator intact. This version may be shafted or shaftless and adapted to be connected at least one end to rope or cable (such as 6 mm diameter braided polyester climbing rope for example) so that the turbine may be hauled up near the top of the mast of a sailing vessel where winds are generally stronger. Rope of this thickness is sufficiently thick to avoid the turbine itself spinning up on the ropes, especially if the turbine is fixed at both ends to ropes.

It is anticipated that the turbine when manufactured will weigh less than 1.5 kg. When rotating at 1000 rpm the noise output is likely to be between 20 and 50 dB which is very low and at least partially enabled by the helical twist in the blades and the flexible mounting system (such as a cable mounting system) described above in which imbalance caused by torque variation with rotational angle is able to perfectly balanced out by allowing the turbine to "wobble" as it rotates. As the flexible line allows some lateral movement, the natural wobble or imbalance inherent in the main rotor as it rotates is compensated for by the wobble of lateral movement in the flexible line. This is lateral movement with respect to the longitudinal axis of the flexible line on which the turbine is installed. Cable mounting the main rotor loosely on a line using a narrow diameter main rotor avoids counter-torque issues, provides high rpm and small mass, which allows the cable to handle the rotor. This reduces wear on bearings and reduces parasitic vibrations and thereby improves efficiency of energy extraction from the wind. A further benefit of the flexible mounting system is that rotor stress is reduced.

The applicant has found unexpectedly that placing a savonius/benesh type rotor with overlapping blades onto flexible cable works well. Ordinarily, it would be expected that the unbalanced characteristics that savonius rotors have would not suit a flexible line mounting.

At least in its first embodiment, the invention provides an elongated helical overlapping (Savonius-type) rotor that is axially non-rigidly suspended for the purposes of safe, quiet and portable power production. The turbine may be suspended by one or both ends, by a light cord or wire or similar with little tension other than that generated by its own weight. The narrow diameter of the turbine provides high rotational speed and minimises the counter-torque created that would otherwise tend to twist its support cable. A safety benefit of narrow diameter blade design is that the rotor may be stopped while spinning at high speed (for example 1000 rpm) by a user simply brushing their hand against or even grasping the rotor. Dissipation of energy while manually stopping is assisted in the cable-mounted version because the flexible cable mounting allows the entire turbine to move laterally when it is obstructed. The helical twist in the rotor allows mechanical and visual balancing and early starting with reduced stall. The overlapping nature of the rotor permits efficient energy extraction, strength of manufacture and low wind speed starting.

FIGS. 9A-14B show a second embodiment of the invention. This embodiment of the invention is similar to that described in relation to FIGS. 1-8 and can be used in the same manner, although there are some differences in the generator arrangement. As can be seen in FIGS. 9A-9C the general shape of the main rotor is the same as that described in relation to FIGS. 3A-3B. As can be seen in FIG. 9C, cross-sections A and C of the rotor 13 are shown with the bridging sections 17. In FIG. 9C, the bridging sections are shown abutting each other indicating the actual manner in at which the two blade sections will be arranged. As noted earlier in relation to FIG. 3C, the bridging sections are shown in a spaced apart arrangement. FIG. 9C also shows the rotor 90 and armature 91 of the generator 92 that are housed in the bottom bulb 23 of the main rotor 13. FIG. 10A shows the generator 92 in more detail.

Only the differences, which relate to the generator 92, will be described here. All other aspects of the second embodiment of the turbine 13 can be assumed to be the same as described in relation to the first embodiment.

As in the first embodiment described in relation to FIGS. 6 and 7, the generator 92 is housed near the base of the main rotor 13 in the housing 23. The generator 92 is co-axial with the longitudinal axis of the turbine. The generator has a planar arrangement, where the rotor 90 surrounds the armature 91. The generator rotor 90 is of a permanent planar magnetic ring type, wherein the rotor comprises of two annular plates 90a, 90b, each of which supports a number of magnetic elements 94 forming the poles of the generator rotor. The two annular plates 90a, 90b are spaced apart and supported by an annular circumferential wall 90c. This defines a space in which the generator armature 91 can reside. The armature, is therefore sandwiched between the two plates of the planar magnetic ring rotor 90. The armature comprises a number of armature windings 95 forming the poles of the armature 90. The armature is retained in place between the two rotor plates 90a, 90b.

A pair of bearings 96, 97 are provided for coupling the rotor 90 and armature 91 to the pins 20, 21. The outer race of the lower bearing 97 is mounted within a seat 95 formed by the interconnection of the two halves 23a, 23b of the housing 23. The inner race is attached (and perhaps keyed) to the lower pin 21. The inner end of pin 20 passes through the rotor 90 and is connected non-rotatably (by keying for example) to the armature 91.

The rotor 90 is connected to the housing 23 and can rotate about the armature 91. As can be seen, the rotor 90 is connected to an inner shelf 114 inside the housing 23. A top bearing 96 is mounted between the central passage 99 of the generator rotor 90 and the pin 20 to allow the turbine, the generator rotor 90 to rotate with respect to pin 20. The pin 20 extends through the generator rotor 90 and armature 91 and is connected to a mounting 100 that supports the armature 91. The rotor 90 and armature 91 comprise central aperture 101, 102 through which the pin 20 can extend. The planar rotor 90 arrangement with coreless armature reduces friction which reduces the start up torque of the generator 92, and improves efficiency of energy extraction by avoiding losses in the core. The rotor 90 also comprises larger magnets to improve power generation efficiency.

FIG. 11A shows an exploded section view 23 and generator 90 that indicates the assembly of the housing 23 and the generator 90 (which is formed as two separate halves) around an existing flexible line 103. As described previously, housing is formed as two separate halves that can be attached together around the central flexible line upon which the turbine is to be installed. Further, the generator rotor 90 is formed as two halves 110a, 110b of a split permanent magnet ring that can be assembled in the housing (and seated in the internal shelf 114) as two halves around a flexible line. Similarly, the armature 91 is formed in two halves 111a, 111b as a split armature winding mounting plate that can also be assembled in two halves around a flexible line.

The upper and lower bearings 96, 97 that allow rotation of the pins 20 and 21 relative to the main rotor 13 are also formed as split bearings 96a, 96b, 97a, 97b that can be assembled around a central flexible line.

Where the turbine has a shaft running through it, the bearings are fitted to the shaft and held in place with an external circlip. In the case of the threaded embodiment, the bearing spaces will be crimped to the cable or rope, thereby fixing the bearings. A similar arrangement could be provided where the turbine is assembled as two parts around the flexible line. Any of these arrangements enable the turbine to be fixed in a longitudinal position on the flexible line, to prevent the rotor 13 moving longitudinally, and in particular falling to the ground under the force of gravity.

This arrangement shown in FIG. 11A and also in FIG. 6, 7 allows for the turbine apparatus to be retro-fitted to an existing flexible line 103 or other axis. To do so, the two halves of the rotor 90 and armature 91 are installed in respective halves 23a, 23b of the main rotor housing 23 and secured in place. Further, each half of the bearings 97a-97b are installed in a respective half of the housing 23. The two halves of the main rotor 13 are then brought together around the axis 103, which typically will be a flexible line. The two halves are secured in place and the main rotor is secured longitudinally on the line 103. The output cable 104 can then be connected to a rechargeable power storage source, or directly to devices for powering. Upon rotation of the main rotor 13 by the wind around the flexible line 103, the generator 92 will generate power that is supplied along the output cable 104.

Variations of the embodiments may be provided for versatility of use. The turbine may or may not have a central shaft. The turbine may also be assembled around or threaded over an existing slender tie or strut to assist simple retrofitting or assembled around existing more rigid or semi-rigid structural members at the manufacturing stage.

What we claim is:

1. A turbine apparatus for converting movement of a fluid into electrical power comprising:
    a main rotor that is rotatable about a longitudinal axis in response to movement of the fluid in a direction substantially perpendicular to the longitudinal axis, the rotor comprising at least two helical blades arranged about the longitudinal axis with rotational symmetry, the blades being substantially identical in shape and having a lift-producing cross-sectional shape at least along a part of their longitudinal length, each blade having an outer edge lying on a circle defining a diameter of the rotor and an inner edge located between the longitudinal axis and the side of the diameter circle generally opposite to the inner edge such that the inner edges of the blades overlap in cross-section, a generator coupled to the main rotor and having a stationary armature containing windings and a generator rotor connected to rotate with the main rotor and which carries one or more magnets past the windings, and a mounting provided at at least one longitudinal end of the main rotor, non-rotationally connected to the armature, wherein the mounting is adapted to be connected to a flexible line such that the turbine apparatus can be supported by the mounting so as to rotate relative to the flexible line, be substantially immovable along its longitudinal axis but is able to move at least a limited amount in a direction laterally of the longitudinal axis when connected to the flexible line.

2. A turbine apparatus according to claim 1 wherein a mounting is provided at both longitudinal ends of the main rotor and both mountings are adapted to be fixed to the flexible line.

3. A turbine apparatus according to claim 2 adapted to be connected to the flexible line that is sufficiently stiff to resist twisting as the main rotor rotates.

4. A turbine apparatus according to claim 1 wherein the apparatus is formed in two or more segments that can be connected together about the longitudinal axis to connect the turbine apparatus to the flexible line.

5. A turbine apparatus according to claim 4 wherein a central passage of the main rotor is adapted to receive the flexible line which the blades are assembled together about.

6. A turbine apparatus according to claim 4 wherein a central passage of the main rotor is adapted to receive the flexible line which the assembled blades are threaded over.

7. A turbine apparatus according to claim 1 wherein the blades are shaped to comprise at least one bridging section between their longitudinally opposed ends, the bridging section being formed on the side of the blade nearest to the longitudinal axis and shaped such that the bridging sections of all blades contact so as to fix a spacing between blades along their length.

8. A turbine apparatus according to claim 7 wherein the bridging section of one blade is interlocked with the bridging section of the other blade.

9. A turbine apparatus according to claim 7 wherein the bridging sections are formed to provide a central passage along the longitudinal axis of the rotor when the bridging sections are connected together.

10. A turbine apparatus according to claim 7 wherein the bridging sections extend substantially perpendicularly to the longitudinal axis.

11. A turbine apparatus according to claim 1 wherein a shaft is provided along the longitudinal axis of the main rotor and the generator armature is fixed non-rotatably to the shaft.

12. A turbine apparatus according to claim 11 wherein the mountings are provided at either end of the shaft.

13. A turbine apparatus according to claim 1 wherein the generator rotor is cup-shaped and the magnets held thereby rotate about the armature.

14. A turbine apparatus according to claim 1 wherein the generator is positioned at one end of the main rotor.

15. A turbine apparatus according to claim 1 wherein the generator is positioned at a point along the length of the main rotor.

16. A turbine apparatus according to claim 1 wherein the main rotor comprises a light source directed to illuminate at least part of the rotor blades or generator housing.

17. A turbine apparatus according to claim 16 wherein the light source is powered by the generator.

18. A turbine apparatus according to claim 16 wherein the light source is arranged so as to direct light towards an edge of a blade.

19. A turbine apparatus according to claim 16 wherein the light source is arranged so as to cause the rotor or generator housing to glow.

20. A turbine apparatus according to claim 1 wherein the blades are formed from a translucent material.

21. A turbine apparatus according to claim 1 wherein the main rotor has a helical structure to reduce load on its bearing(s).

22. A turbine apparatus for converting movement of a fluid into electrical power comprising:

a main rotor that is rotatable about a longitudinal axis in response to movement of the fluid in a direction substantially perpendicular to the longitudinal axis, a generator coupled to the main rotor and having a stationary armature containing windings and a generator rotor connected to rotate with the main rotor and which carries one or more magnets past the windings, and a mounting provided at at least one longitudinal end of the main rotor, non-rotationally connected to the armature, wherein the generator is coaxial with the longitudinal axis of the main rotor and the main rotor or generator is formed in at least two separate parts which are interconnectable about the longitudinal axis.

23. A turbine apparatus according to claim 22 wherein the mounting is adapted to be connected to a flexible line such that the turbine apparatus can be supported by the mounting so as to be substantially immovable along its longitudinal axis but is able to move at least a limited amount in a direction laterally of the longitudinal axis when connected to the flexible line.

24. A turbine apparatus according to claim 23 wherein the main rotor and the generator rotor are each provided with split bearings mountable about the flexible line to thereby allow the main rotor and generator rotor to rotate freely with respect to the flexible line to which the turbine apparatus it is connected.

25. A turbine apparatus according to claim 23 adapted to be connected to the flexible line that is sufficiently stiff to resist twisting as the main rotor rotates.

26. A turbine apparatus according to claim 22 wherein the mounting is provided at both longitudinal ends of the main rotor and both mountings are adapted to be fixed to a flexible line.

27. A turbine apparatus according to claim 22 wherein the two separate parts can be connected together about the longitudinal axis to connect the turbine apparatus to a flexible line.

28. A turbine apparatus according to claim 22 wherein the rotor comprises at least two helical blades that are shaped to comprise at least one bridging section between their longitudinally opposed ends, the bridging section being formed on a side of the blade nearest to the longitudinal axis and shaped such that the bridging sections of all blades contact so as to fix a spacing between blades along their length.

29. A turbine apparatus according to claim 28 wherein the bridging section of one blade is interlocked with the bridging section of the other blade.

30. A turbine apparatus according to claim 28 wherein the bridging sections are formed to provide a central passage along the longitudinal axis of the main rotor when the bridging sections are connected together.

31. A turbine apparatus according to claim 30 wherein the central passage of the rotor is adapted to receive a flexible line which the blades are assembled together about or threaded over.

32. A turbine apparatus according to claim 22 wherein the main rotor has a helical structure to reduce load on its bearing(s).

33. A method of manufacturing a turbine apparatus comprising the steps of:
  i) moulding at least two separate but identical rotor blades to comprise a helical twist from one longitudinal end to the other, the blades having a substantially constant cross-sectional curvature along their length, the curve having a starting point at a first side edge of the blade and an end point at a second side edge of the blade, and
  ii) creating a main rotor by arranging the moulded rotor blades spaced about a longitudinal axis and in an overlapping manner, and
  iii) mounting a generator to the main rotor so that the rotor of the generator is driven by the main rotor.

34. A method according to claim 33 wherein the step of moulding the blades includes setting an angle of the helical twist dependent upon a concavity of the blades' cross-sectional curvature wherein the concavity of the curve is measured by the angle between tangents to the curve at the starting and end points.

35. A method of manufacturing a turbine apparatus comprising the steps of:
  i) extruding at least two separate but identical rotor blades to comprise a helical twist from one longitudinal end to the other, the blades having a substantially constant cross-sectional curvature along their length, the curve having a starting point at a first side edge of the blade and an end point at a second side edge of the blade, and
  ii) creating a main rotor by arranging the extruded rotor blades spaced about a longitudinal axis and in an overlapping manner, and
  iii) mounting a generator to the main rotor so that the rotor of the generator is driven by the main rotor.

\* \* \* \* \*

UNITED STATES PATENT AND TRADEMARK OFFICE
CERTIFICATE OF CORRECTION

PATENT NO.         : 8,569,905 B2                                             Page 1 of 1
APPLICATION NO.    : 12/294309
DATED              : October 29, 2013
INVENTOR(S)        : Boyd-Wilson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this
Twenty-second Day of September, 2015

Michelle K. Lee
*Director of the United States Patent and Trademark Office*